United States Patent [19]

Hicks, Jr.

[11] Patent Number: 4,659,923

[45] Date of Patent: Apr. 21, 1987

[54] FIBER OPTIC INTERFEROMETER TRANSDUCER

[75] Inventor: John W. Hicks, Jr., Northborough, Mass.

[73] Assignee: Polaroid Corporation, Cambridge, Mass.

[21] Appl. No.: 549,875

[22] Filed: Nov. 9, 1983

Related U.S. Application Data

[63] Continuation-in-part of Ser. No. 241,861, Mar. 9, 1981, abandoned.

[51] Int. Cl.[4] .............................................. H01J 5/16
[52] U.S. Cl. .............................. 250/227; 250/231 R; 73/705
[58] Field of Search ............... 250/227, 231 R, 231 P, 250/225; 356/351, 33, 375; 350/371, 400, 96.1; 73/705, 655, 656, 657, 800, 862.38; 324/96

[56] References Cited

U.S. PATENT DOCUMENTS

| | | | |
|---|---|---|---|
| 3,645,603 | 2/1972 | Smith | 350/371 |
| 3,842,664 | 10/1974 | Conway | 73/800 |
| 3,910,105 | 10/1975 | Hoffstedt | 73/800 |
| 4,171,908 | 10/1979 | Robert et al. | 73/800 |
| 4,173,412 | 11/1979 | Ramsay et al. | 356/33 |
| 4,259,016 | 3/1981 | Schiffner | 356/351 |
| 4,281,245 | 7/1981 | Brogardh et al. | 250/227 |
| 4,295,738 | 10/1981 | Meltz et al. | 73/800 |
| 4,302,107 | 11/1981 | Schiffner et al. | 356/350 |
| 4,342,907 | 8/1982 | Macedo et al. | 73/705 |
| 4,420,251 | 12/1983 | James et al. | 73/800 |
| 4,420,260 | 12/1983 | Martinelli | 356/351 |
| 4,442,350 | 4/1984 | Rashleigh | 250/227 |
| 4,466,295 | 8/1984 | Wesson | 350/371 |
| 4,477,723 | 10/1984 | Carome et al. | 250/227 |
| 4,488,040 | 12/1984 | Rowe | 250/227 |

Primary Examiner—David C. Nelms
Attorney, Agent, or Firm—Francis J. Caufield

[57] ABSTRACT

A sensor or transducer having a dual path optical fiber, such as a single mode, two polarization state, waveguide fiber, utilizes the relative change in propagation constant of the paths to sense and transduce an applied force to an interference variation and ultimately an electrical signal. In this arrangement, in-phase light is introduced to both polarized states or paths in the fiber and transmitted therealong past a stress area of birefringement inducing force and ultimately combined, thereby producing in the combined beam a variation in interference which is related to the applied force. Specific structures are provided for converting isotropic forces such as pressure and temperature to anisotropic forces on the fiber to thereby produce birefringement and to also magnify the latter effect.

32 Claims, 19 Drawing Figures

FIBER OPTIC INTERFEROMETER TRANSDUCER

CROSS REFERENCE TO RELATED APPLICATIONS

This patent application is a continuation-in-part of pending U.S. patent application Ser. No. 241,861, filed Mar. 9, 1981, now abandoned, for Fiber Optics Pressure Transducer.

BACKGROUND OF THE INVENTION

This invention relates primarily to interferometers and, more particularly, to an interferometer sensor or transducer which utilizes fiber optics transmission elements.

The primary function of an interferometer is for analyzing or filtering the spectral content of a beam of light, and it is known that an interferometric measurement is altered when one or two beams of light are used and one of the beams is affected in some way. Interferometers employing a pair of fiber optic elements for providing its two light paths are known. In that arrangement, physical interaction with one of the fiber elements (the other fiber being maintained as a reference) produces either a difference in path length for the two transmitted beams or a difference in the intensities thereof, or both. A measurement of the differences indicates the magnitude of the physical interaction.

Fiber optics devices are well-known to comprise plastic or glass structures having a core of relatively high index of refraction surrounded by a cladding of relatively low index of refraction. The outstanding feature of fiber optics devices is their ability to guide light by means of the core, even as the fiber device is bent or curved. Thus, the art and science of fiber optics offers a particular opportunity in terms of the usage and value of interferometric measurement.

Optical fibers, both multimode and single mode, are well known. In the single mode fiber, its single mode is essentially transmitted by having a fiber core of a diameter which allows only limited mode transmission in terms of wavelengths greater than a specified "cut-off" wavelength. However, a single mode fiber, which is circularly symmetric, actually has two possible polarization states or modes, both having the same propagation constant. Thus, a so-called "single mode" fiber in effect has two modes or optical paths which degenerate in propagation constant. On the other hand, a fiber which is not circularly symmetric removes the degeneracy such that the two polarization states have different propagation constants. In any event, such "single mode" fibers are still commonly referred to as "single mode" without regard to the two polarization states included.

SUMMARY OF THE INVENTION

In accordance with a preferred embodiment of the invention, an interferometer is provided by introducing light polarized at 45° to the axes of the two polarization modes of a single mode fiber so that both polarization modes are excited with light of fixed relative phase. At the distal end of the fiber, an analyzer placed at 45° to each polarization mode combines the energy exiting from the two paths, thus providing interference.

Now, when a force is applied to the fiber, perpendicular to its length, birefringence causes the index of refraction for light polarized parallel to the applied force to differ from the index for light polarized perpendicular to the force, and the amount of difference is a measure of the applied force. Hence, the system provides a sensor or transducer, whose output is available to actuate a switch or to be used for modulation.

Accordingly, a primary object of the present invention is to provide a sensor or transducer of an environmenal factor which uses fiber optics technology for its construction.

A further object of the present invention is to provide a fiber optics interferometer useful as either a sensor, transducer, modulator or switch.

These and other objects of the present invention are satisfied by an interferometer transducer which features an elongated optical fiber having a pair of light paths, such as a single mode fiber having two polarization states; means for introducing light energy of fixed relative phase to each path; means for combining the light energy transmitted by both paths to provide interference thereof; and means for evaluating such interference, whereby the result of such interference will vary in accordance with the change in a given environmental factor applied to the fiber. Also included are application devices for amplifying the stress of the fiber and for converting isotropic stress to anisotropic stress on the fiber to thereby produce a difference in the propagated beams and, in turn, a difference in their interference; the latter being used to indicate the magnitude of the environmental factor or to actuate a switch or provide modulation.

Other objects, features and advantages of the present invention are provided in the following more detailed description of preferred and alternative embodiments by reference to the accompanying drawings wherein:

DESCRIPTION OF THE PREFERRED EMBODIMENTS

This invention comprises an interferometer utilizing two distinct optical paths within a single fiber. A preferred embodiment comprises a single mode fiber (that is to say, a fiber of a diameter which allows only one transmission mode for all wavelengths greater than a specified "cut-off" wavelength). It is well-known that a single mode fiber which is circularly symmetric has two possible polarization modes which have the same propagation constant. Strictly speaking, a so-called "single mode" fiber actually has two modes, but they are degenerate in propagation constant.

If the fiber is not circularly symmetric, then the degeneracy is removed and there may be two polarization modes with differing propagation constants. Ordinarily, this is still commonly referred to as a "single mode" fiber.

Figure 1:
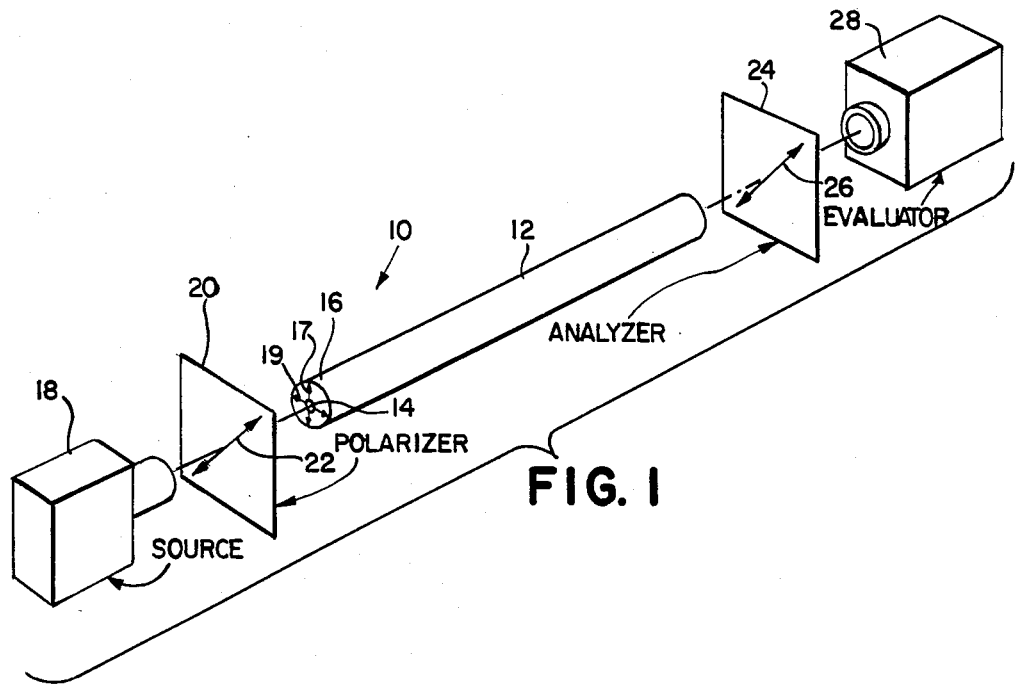
FIG. 1 is a diagrammatic view in perspective of a fiber optics transducer device.

FIG. 1 is a diagrammatic view of an interferometer transducer or sensor 10 made in accordance with the invention, and illustrates a conventional single mode fiber 12 having a glass core 14 and glass cladding 16 both, for example, of fused silica with slightly different index of refraction, which provides two light paths or polarized states designated along axes 17 and 19. Preferably, a single wavelength of light (preferably within near ultraviolet to near infrared) is introduced in the fiber 12 by means of a coherent, preferably monochromatic source 18 such as a laser and a polarizer 20. The polarizer 20 is a plane polarized sheet mounted before the fiber 12 with its axis of polarization 22 at approximately 45° to the fiber polarization axes 14 and 16 so as to introduce approximately equal amounts of light energy to both polarized states. Light output from both paths is delivered to a second plane polarized sheet or analyzer 24 which combines the light exiting from both polarized modes of the fiber 12 thereby providing interference therebetween. The combined (interfered) light, in turn, is passed to a light sensitive evaluator 28 which, by means of a photosensitive cell and conventional circuitry, (not shown) provides an electrical output representing a continuous measurement of the intensity value of the interfering light.

If an anisotropic force is applied to the fiber 12 at an angle to the fiber axis, particularly along a direction normal to the fiber axis, the fiber material becomes birefringent; that is, the index of refraction, and hence, the propagation constant, for light parallel to the applied force will differ from the index for light polarized perpendicular to the direction of the force, with the change in index being proportional to the applied force. The change in index, in effect, alters the propagation constant; that is, the optical path length of the two paths (i.e., the two polarized states), and thus effects the resulting interference upon transmission through the analyzer 24. Hence, the intensity value measured by the evaluator 28 will sweep from a minimum to a maximum value as the force is varied over a select range and back and forth between these maxima and minima in a sinusoidal fashion over a longer range.

While for clarity of the illustration the polarizer axis 22 and analyzer axis 26 are shown parallel, it should be noted that they will often be otherwise. That is, the input to the fiber 12 is initially equalized by slightly pivoting the polarizer 12 to produce an approximately equal output from each fiber path. However, since the two polarized states at the distal end of the fiber are not necessarily aligned with the angle of orientation of the states at the entrance to the fiber, the analyzer 24 axis will not necessarily be aligned with the polarizer.

As indicated, the evaluator 28 provides a measure of received intensity and, more specifically, produces an electrical signal proportional to the change in interference, and thus the change in applied force. Consequently, the evaluator output can be utilized for a direct readout of the applied force, or for switching, etc.

Figure 2:
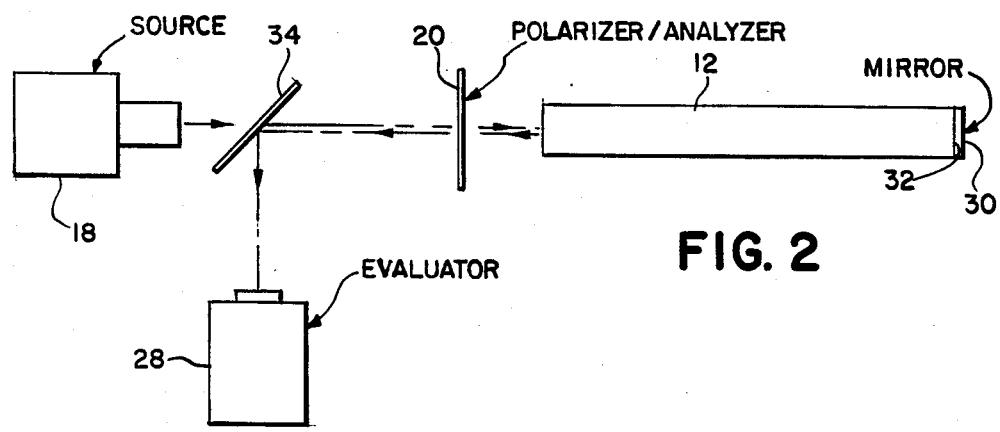
FIG. 2 is a top view of an alternate embodiment illustrating a single-ended fiber optics transducer of the present invention.
Figure 10:
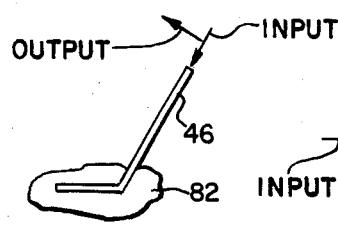
FIGS. 10 and 11 illustrate embodiments of the present invention wherein blood pressure measurements or other pressure measurements are made by use of an inserted fiber optics device of the present invention.
Figure 11:
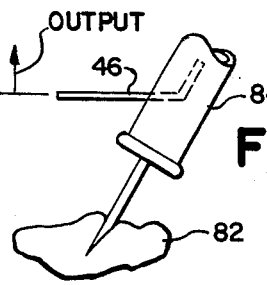

In FIG. 2 an alternate embodiment is illustrated in which, in contrast to the double-ended fiber arrangement of FIG. 1, both the input and output of the fiber 12 are at the same end, thereby facilitating the insertion of the distal end of the fiber in force applying environments as later explained with regard to FIGS. 10 and 11.

In the embodiment of FIG. 2, the single mode fiber 12 carries a mirror 30 at its distal end 32 (for example, the end 32 may be polished and reflectively coated) for reflecting the signal inputed from source 18 through analyzer 20 back through the fiber length. To accommodate both light input and output at the one end, the light from the source 18 is first directed through a divider arrangement, such as a half silvered mirror 34, which directs the returning beam exiting from the fiber to the evaluator 28. In this arrangement, the polarizer 20 operates not only as a polarizer to equally input light to both polarization paths of the fiber but also as an analyzer for the returning beams to combine them for interference.

In the transducers illustrated in FIGS. 1 and 2, the range of applied force which will provide unique outputs is limited. Thus, as the applied force is varied in a given direction, for example increased, the interfered light output (and the evaluator output) will vary from a minimum (extinction or near extinction for the light output) to a maximum, and then back to the minimum. If the force is still further increased, the output will continue further through one or more such cycles. Therefore, a simple measurement of light output intensity will not give a unique force reading since, in general, the number of cycles is not known. Of course, the length and sensitivity can be adjusted such that the pressure range encountered will not sweep through more than one cycle. However, this will limit overall sensitivity of the interferomter transducer.

To cope with this problem, two or more transducers of different fiber lengths may be utilized to extend the range by virtue of the broad range of unique values which can be achieved from the combination of two transducer outputs. Preferably, however, as described below with regard to FIG. 3, two or more wavelengths of light may be employed with a single fiber.

Figure 3:
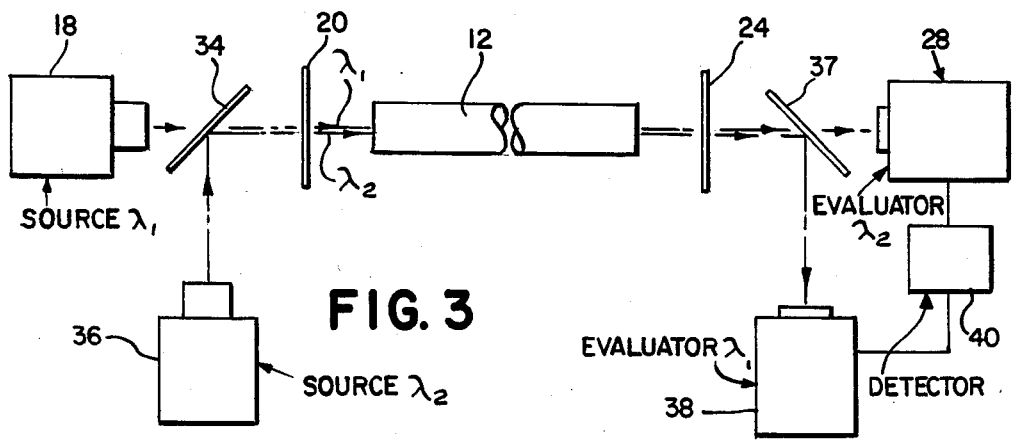
FIG. 3 is a top view of broad range, dual wavelength transducer.

Consquently, to provide increased range for the sensor, two wavelengths can be utilized as illustrated in the embodiment of FIG. 3. Herein, in addition to source 18 providing a first ($\lambda_1$) wavelength input (e.g., in the red range), a second source 36 providing a second ($\lambda_2$) wavelength (e.g., in the blue range) is also employed. Both sources 18 and 36 are directed to a divider 34 for transmission through analyzer 20 to the input end of fiber 12 where both wavelengths are introduced to both polarized paths.

At the exit end of the fiber 12, the light is recombined by analyzer 24, thereby providing interference for common wavelengths in each path, and passed to an interference filter 37 with the interfered light from source 18 being transmitted to a first evaluator 28 and interfered light from the source 36 passing to a second evaluator 38.

Completing the structure is a detector 40 which combines the outputs of both evaluators 28 and 30. Thus, while each evaluator is individually swept from a minimum to maxiumum intensity as a force is applied to the fiber 12, the combined evaluation from detector 40 will sweep over a larger range of values without redundancy and thus measure a greater range of applied force.

As previously indicated, when force is applied to an elongated fiber 12, non-parallel to its length, the vitreous material becomes birefringent and the relative optical path.length is varied so as to vary the resulting interference. However, when pressure is applied to such a fiber, it evenly exerts a force on all sides and will not produce birefringence.

Figure 4:
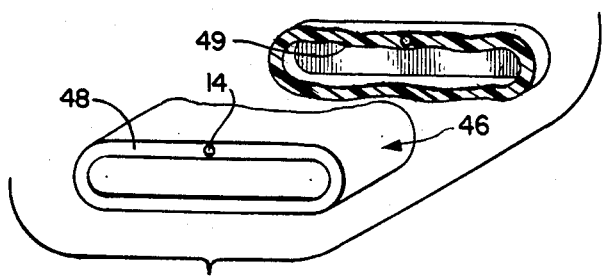
FIG. 4 is a schematic representation of an embodiment of the interferometer fiber which amplifies the transducer effect and reacts to uniform, non-directional forces and employs a fiber core embedded into the exterior wall of a tube of generally elliptical or rectangular cross-section.

An embodiment of the fiber portion of this invention which converts uniform, non-directional pressure into a directional force on the fiber is shown in FIG. 4 wherein the fiber core 14 is imbedded in one wide lateral wall 48 of a hollow glass tube 46 of elliptical or rectangular cross-section. The core 14, or overall fiber, with surrounding portions of the tube 46 providing cladding, runs longitudinally along the tube. Further, as later explained with regard to FIGS. 6-8, a complete fiber element 12 carrying its own cladding may also be embedded directly in the tube 46.

Figure 5:
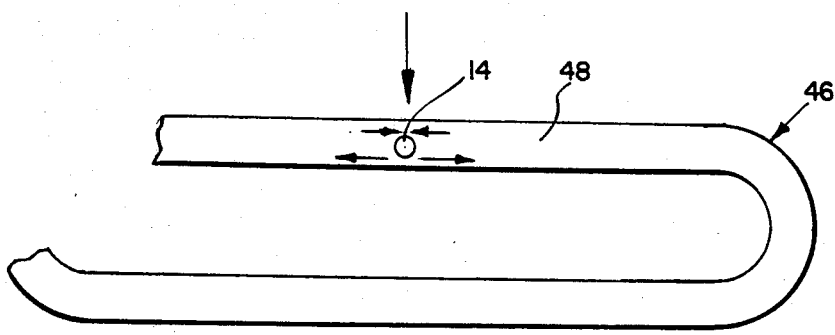
FIG. 5 is a schematic representation of the embodiment of FIG. 4 illustrating the production of stress within the tubing wall due to external pressure.

When pressure is applied to the outside of the tubing 46, as shown in FIG. 5, the long side walls tend to collapse inward, which produces an anisotropic stress on the fiber core 14 as shown. Thus, not only is an anisotropism produced, but additionally there is a magnification of the applied pressure, increasing as the ratio of lateral length to thickness of the side wall 48.

To produce such an anisotropic stress, there must be a difference between the internal and external pressure, thus the applied pressure must be maintained solely on the exterior or interior of the tubing. This can be accomplished by restricting the applied pressure to a central portion of an elongated tube 46 or by sealing one or both ends of the tube as by means of end walls such as illustrated by end wall 49 in FIG. 4.

Figure 6:
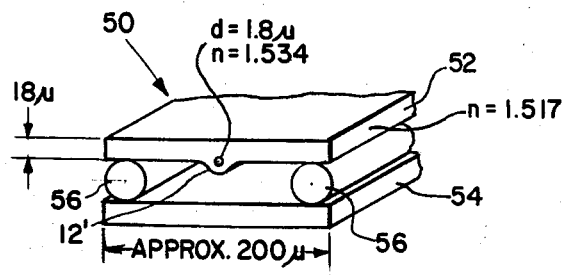
FIG. 6 is a schematic representation of an alternate structure of the fiber geometry of FIGS. 4 and 5 wherein rectangular tubing is assembled from ordinary window glass and spaced by rods with the fiber embedded within one rectangular wall.
Figure 7:
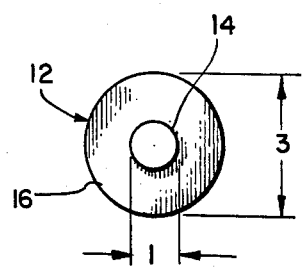
FIG. 7 is a cross-sectional representation of the fiber element employed in FIGS. 4 and 6.
Figure 8:
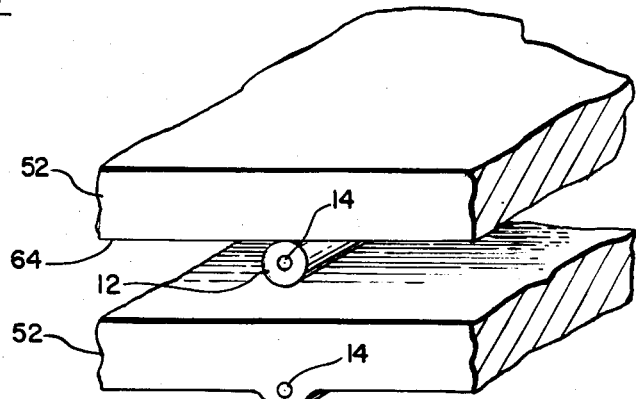
FIG. 8 is a schematic representation of the structure of FIG. 6 illustrating a particular construction achieved by blending the fiber element into the tubing wall through wetting and surface tension.

An example of a pressure converting embodiment of the invention and its construction is illustrated in FIGS. 6-8 wherein a rectangular tubing 50 was assembled from two flat pieces 52 and 54 of ordinary soda lime window glass of index 1.517, spaced by two soda lime rods 56, as shown. The rods 56 are $\frac{1}{8}"$ in diameter and the window glass about $\frac{1}{8}"$ thick and $1\frac{1}{2}"$ wide. A single mode fiber 12 (see FIG. 7) was first constructed from a core 14 of Schott ZK-5 zinc crown glass, of index 1.534, clad with soda lime clad tubing 16 of index 1.517 with a 1:3 core to outer diameter ratio and drawn to about 0.012" outer diameter. The fiber 12 was then laid against the inner wall 64 of the plate 52 in the rectangular tube assembly and the entire assembly drawn down to the approximate dimensions shown in FIG. 6.

The drawing down fused the rods to the plates, thereby sealing the lateral edges; and the optical fiber 12 became attached to, and partially blended into, the tubing wall by wetting and surface tension as illustrated in FIG. 8. The fiber 12 did not remain circular, however, its shape being distorted by the flowing action as it is blended into the wall. Its diameter was drawn to approximately 1.8, thus having a cut-off wavelength of approximately 5500 Angstroms, and the device was used in the region between 5500 and 6500 Angstroms.

The resulting device shown in FIG. 6 produced some residual birefringence, even in the absence of external pressure, due, in part, to the distorted fiber shape and perhaps in part to stresses in the glass. However, a moderate amount of birefringence is actually useful since it initially allows scanning through the light spectrum to find a wavelength at which there is complete extinction between crossed polarizers for a given fiber length.

The sensitivity of the device of FIG. 6 is such that 10 pounds per square inch of pressure applied to 3 inches of length sweeps the output light intensity from extinction through maximum brightness back to extinction or, that is, produces one full wavelength of birefringent retardation. By reducing the wall thickness or increasing the lateral span (the width) of the rectangular devices can be made with 2 pounds per square inch sensitivity for full wave retardation. Of course, increased length of the assembly also produces increased sensitivity. In the embodiments of both FIG. 4 and FIG. 6, pressure on the tubing deflects the long cross-sectional walls inwardly and produces an anisotropic stress on the fiber generally along a direction normal to the wall. As indicated previusly, the stress is magnified, with the magnification increasing with the ratio of lateral wall length to wall thickness.

There are several ways of instrumenting such a sensor for use in measuring pressure. One method is to adjust the internal or external pressure of the tubes from a reference source 46 or 50 to exactly match the applied pressure, thereby using the transducer as a null measuring device. This arrangement may advantageously reduce errors due to temperature variations. That is, since the Young's modulus of glass changes with temperature, the scale factor of the pressure sensitivity will change somewhat with temperature.

Of course, one must then measure or determine the reference pressure that matches the applied pressure. However, this might be done in a far less hostile environment.

Figure 9:
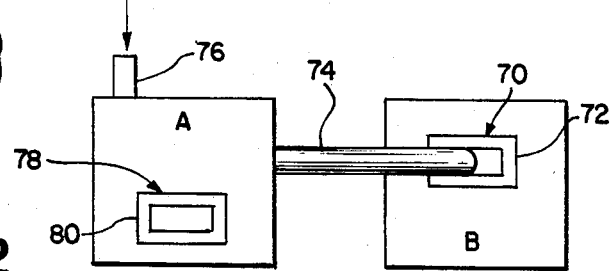
FIG. 9 illustrates an embodiment of the present invention wherein pressure in a given volume is maasured by comparison between a sensing transducer and an external reference transducer.

Thus, as shown in FIG. 9, if the pressure in vessel B is to be measured and its temperature is unknown, the pressure can still be measured accurately by means of a second temperature controlled vessel B. In this regard, a first rectangular transducer 70 constructed in accordance with the embodiment of FIGS. 2 and 8 and sealed at one end, is extended within or through the vessel B such that the exterior of the fiber bearing tube 72 is exposed to the unknown pressure in vessel B. The other end of the fiber bearing tube is in communication with the pressure in vessel A by means of a hollow conduit 74 such that the interior of the fiber bearing tube 72 is exposed to the pressure of vessel A; the pressure of the latter being variable from a source (not shown) through an input conduit 76. Alternatively, both ends of the fiber bearing tube 72 may be in communication with the pressure in vessel A.

A second transducer 78, also constructed with a rectangular fiber bearing tube extends within or through pressure vessel A. Since the interior of the latter transducer is left open to atmospheric pressure, it need not be completely sealed.

In operation of the system illustrated in FIG. 9, the pressure is varied in vessel A until it equals the pressure in vessel B, at which point a null occurs in the interferometer output of transducer 70 in vessel B (the null point of the first transducer 70 being previously determined by deliberately equalizing its internal pressure either outside the vessel B or by temporarily introducing the pressure of vessel B to the interior of the tubing 72). When the null point occurs, the interferometer reading of the second transducer 78 is equal to the pressure in vessel B, assuming, of course, that vessel A is at a given known temperature and that the second transducer 78 has been calibrated for that temperature.

The just-described measurements are of quasi-static pressures; however, these structures are also useful in providing dynamic responses to varying pressures. The maximum frequency response of such a device depends on the actual dimensions. With the dimensions given with respect to FIG. 6, resonance occurs at approximately 100,000 hertz, and so the frequency response should be reasonably flat up to 20,000 hertz. This makes this transducer useful as a microphone or hydrophone. By coiling up a long length of the tubing, increasingly greater sensitivity is obtained.

Further, such a device is also useful for measuring blood pressure, not only as a quasi-static indicator, but as a dynamic indication throughout the full heart beat cycle. In this way, it may perform two functions similar to the blood pressure cuff measurement and an electrocardiogram combined. As shown in FIG. 9, the fiber bearing tubing 46 of FIG. 4 may be inserted into a blood vessel 82, or the blood pressure extended outside the vessel into a small chamber 84, for measurement as shown in FIG. 11. As shown in this figure, the input and output of the transducer is preferable at one end of the fiber, as shown in FIG. 3, with the inserted end carrying the required reflective elements. For suitable operation, the inserted end of the tubing 46 is closed so as to permit the required pressure differential between the interior and exterior of the tubing.

The fiber optics transducer of this invention has several medical advantages over standard patient contact devices now used. Perhaps the greatest advantage is that it is optical and so the patient is not exposed to electrical shock.

Figure 12:
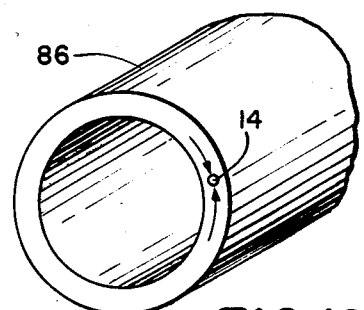
FIG. 12 is a representation in perspective of an imbedded fiber in a tube wall for producing an isotropic compression from applied external pressure.

Other geometries are possible for converting pressure to an anisotropic stress and for magnifying the effect. One simplified construction is shown in FIG. 12, wherein a hollow cylindrical tube 86 with the fiber 12 imbedded in the sidewall, produces compression along the paths designated by arrows as shown, when external pressure is applied to the tube. The ratio of the compression stress of the fiber to the external pressure is $R = d/t$ where d is the tube diameter and t is the wall thickness.

Figure 13:
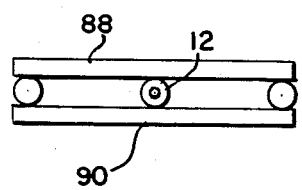
FIG. 13 is an alternative geometry to that shown in FIG. 12.

Another presure transducing and amplifying geometry is shown in FIG. 13 wherein the fiber 12 runs longitudinally within a tube between and in engagement with a pair of sidewall plates 88 and 90. The advantage of this embodiment (FIG. 10) is that the pressure gain ratio is proportional to $(L/t)^2$ rather than $L/t$ and so for a given "fragility", it is more sensitive than the embodiment of FIG. 12.

Figure 14:
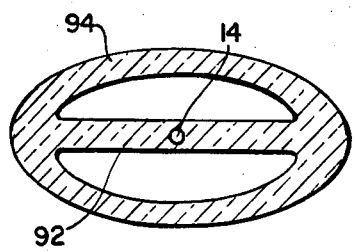
FIG. 14 is a view in section of a fiber geometry for converting pressure to lateral tension of the fiber element.

In FIG. 14, a further geometry of a pressure sensitive fiber portion is shown wherein the fiber 12, or at least its core 14, is embedded in the generally bisecting arch 92 of a hollow tube 94 of elliptical cross-section. For pressure applications, the arch 92 preferably runs along the long axis of the ellipse such that pressure on the exterior of the tubing 4 increases the tube width, thereby stretching the arch 92 and its embedded core 14, whereby the core is subjected to lateral tensional forces.

Figure 15:
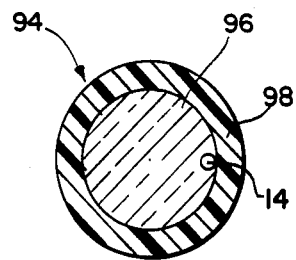
FIG. 15 is a view in section of a fiber optic portion of a transducer employing birefringent sensitive cladding.

FIG. 15 illustrates a further pressure-converting geometry wherein a fiber 94, having a glass core 14, is mounted near or at the surface of a glass cladding cylinder 98 which is encased in a birefringent sensitive sleeve such as a plastic jacket or layer 98.

The plastic layer 98, which has an index of refraction slightly lower than that of the cladding cylinder 98, is perhaps two or three core diameters thick. It could be thicker, but it is not necessary. For good sensitivity, the core is placed very close to the surface of the cylinder 98. With this geometry, isotropic pressure produces anisotropic radial stress on the thin plastic layer. The plastic has a much higher coefficient for birefringence as a function of stress than does glass. In fact, some plastics have as much as 1,000 times the stress birefringence of glass. An elastomer or epoxy type polymer having an index of refraction lower than that of the core is suitable.

In this plastic layer arrangement, the evanescent field of the core is affected by the stress-induced birefringence of the adjoining plastic so that the overall waveguide provided by the fiber 94 becomes birefringent with applied pressure.

Figure 16:
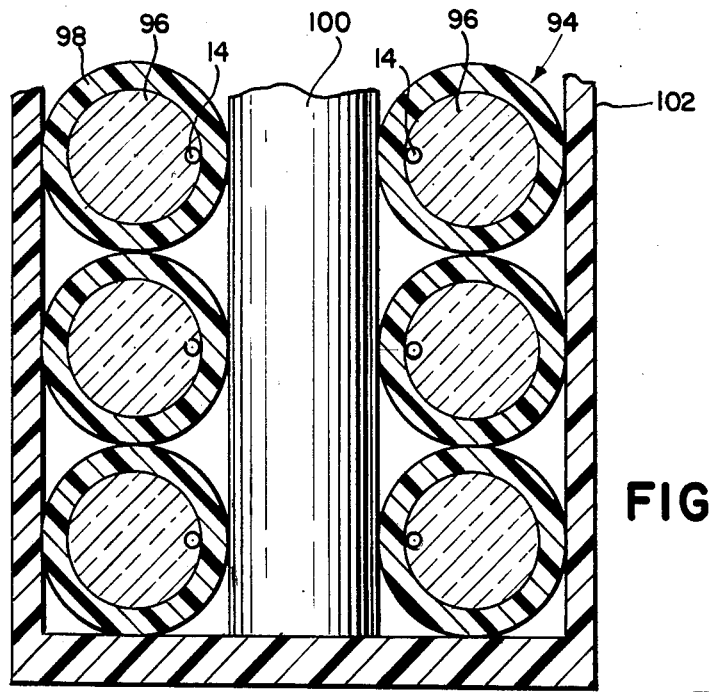
FIG. 16 illustrates the use of the fiber of FIG. 15 in a mechanically amplifying structure.

To increase the just-noted effect, the fiber 94 is wound on a solid, relatively hard mandrell 100 with the core edge of the rotationally assymetric fiber 94 in in contact with the mandrel, and the structure is then enclosed in a flexible hermitic seal or flexible casing 102. Since the turns of the fiber 94 all bear on a small area of contact with the mandrel, the pressure at the contact is magnified as compared to the pressure external of the casing 102. The embodiment of FIG. 16 operates similarly to that of FIG. 15, but with an extra mechanism for mechanical advantages. In any case, however, both these embodiments of FIGS. 15 and 16, like those of FIGS. 4, 6, 13 and 14 not only convert an isotropic applied force (specifically, pressure) to an anisotropic force, but also magnify the stress effect.

Prior to discussing the remaining embodiments, it should be realized that the embodiments ilustrated in FIGS. 4, 6 and 13-16 are directed to converting an applied isotropic force, (specifically pressure), to an anisotropic force on the optical fiber portion of the overall interferometer system. Additionally, each of these magnify the induced stress or, that is, the resulting birefringment. In this regard, it should be understood that these fiber assemblies are also useful for measuring isotropic applied forces.

Figure 17:
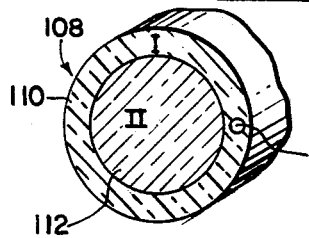
FIGS. 17 and 18 illustrate a fiber construction designed for high sensitivity to thermal stress.
Figure 18:
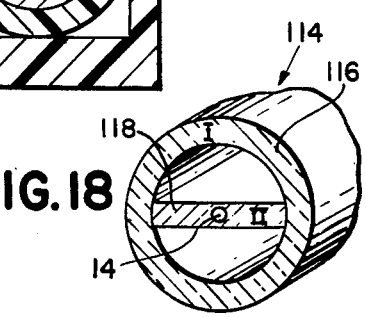

FIGS. 17 and 18 illustrate the fiber optics portion of a temperature sensitive transducer constructed in accordance with the invention. In this arrangement, a temperature variation produces birefringing stress which alters the relationship of the optical path lengths, and thus, the interference of the combined light from both paths of the fiber.

FIG. 17 illustrates an elongated rod member 108 consisting of a preferably solid glass cylinder 112 designated as region II circumferentially enclosed within a glass layer or sleeve designated as region I. The core 14 is embedded in region I running longitudinally of the rod member 108. Preferably, the Region I is of a lower index of refraction that the core 14 so as to operate as the cladding thereof and to provide a single mode waveguide therewith.

The core 14 is preferably centered within region I and the thickness of the latter is perhaps four or five times the diameter of the core 14, such that while the index of refraction of region II is preferably the same as that of region I, it may be of different index since it is sufficiently spaced from the core 14.

To provide the required temperature induced stress or, that is, temperature induced birefringence, region I has a different coefficient of expansion than that of region II. Preferably, region I has a higher coefficient of expansion than region II, such that (as explained below) after drawing, the region is under compression. Consequently, when the rod 108 is subjected to increasing temperature in the environment to be measured, region I suffers reduced compressive stress and reduced birefringence such that an interferometer arrangement (as in FIGS. 1–3), employing rod 108 as its fiber portion operates as a birefringent temperature sensor or trans-ducer.

The temperature reacting rod 108 may be constructed by first forming a relatively large diameter tube or cylinder of, for example, fused silica having an enlarged waveguide core therein; the latter being formed in or embedded in the tube, for example, as explained with regard to FIG. 8. An enlarged rod is then formed of fused silica, for example, having an outside diameter slightly less than the inner diameter of the tube, and in accordance with conventional heat treating and glass forming techniques, the thermal expansion of the tube is made slightly less than that of the rod.

The rod and the core carrying tube are then assembled and drawn down to convenient diameter in keeping with the desired final size of core necessary for the desired wavelength of the interferometer. The drawing thus fuses the rod and tube together, although such fusing is not necessary; but, more importantly, places the tube, now sized to form the sleeve 110 of FIG. 17, under compression.

Other thermally sensitive fiber elements are also possible. For example, FIG. 18 illustrates an alternate geometry wherein an elongated tube 116 of glass material similar to the sleeve 110 (region I, of the embodiment of FIG. 17) is utilized with a bridge plate 118 of region II material.

In this arrangement, the core 14 is mounted within the plate 118 such that the latter now provides the waveguide cladding as in the just-noted embodiment. The sleeve 116 is of lower thermal expansion than the bridge plate 118 so that the latter, which carries the core, is under compression after drawing and undergoes a reduction in such compression and its birefringence when the temperature is later elevated.

Figure 19:
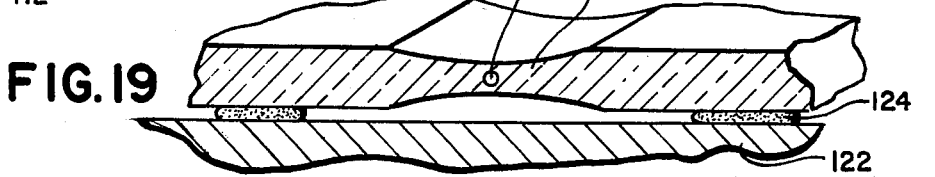
FIG. 19 is a view in section of a strain gauge fiber arrangement configured for measuring applied tensional forces.

In FIG. 19, a fiber construction useful for measuring the stretching or expansion of a substrate member 122 is shown. In this arrangement, a fiber 120 is constructed as a plate 122 of glass having a necked-down portion 122 which extends along the longitudinal axis of the plate and carries the core 14 therein. Thus, the core 14 and the surrounding areas of the necked-down portion 122 provide the waveguide portion for mounting in the overall interferometric sytem of FIGS. 1–3.

In use, the fiber 120 is laterally affixed to the member 122, which is to be measured, such as by an adhesive cement 124. Hence, this provides a birefringent strain gauge. If the substrate member 122 is stretched, the two out riggers of the fiber are pulled outwardly, putting a high stress on the thin central web 122 containing the core 14.

Other alternative embodiments are contemplated by the above explanation and description, and the present invention is thereby to be accorded the full scope of the following claims.

I claim:

1. A transducer comprising:
   an optical fiber having at least two different optical paths extending over a given length with the propagation constant of at least one of said paths being variable in response to an environmental factor applied to at least a portion of said given length;
   means for introducing light energy of fixed phase relationship into both said paths at one end of said length of optical fiber;
   means for combining the light energy transmitted along each said path so as to provide interference therebetween;
   evaluating means for evaluating said interference and for providing an output related thereto; and
   reflective means adjoining the other end of said fiber length for reflecting said light energy transmitted along both said paths back toward said one end, and said introducing means located at said one end includes means for combining the reflected energy.

2. The invention of claim 1 wherein said introducing means includes a polarizer for introducing light to said paths, and said polarizer operating as an analyzer for light reflected back from said other end to combine said light for interference.

3. The invention of claim 1 wherein said optical fiber is a single mode optical waveguide fiber having a single mode with two polarization states which define said different paths.

4. The invention of claim 3 wherein said combining means comprises means for polarizing the light energy transmitted along both said paths to a plane polarized state at an angle to both said paths.

5. The invention of claim 3 wherein said introducing means includes a plane polarizer illuminated with coherent radiation, with the polarization plane of said polarizer being oriented at an angle to both said paths so as to introduce light energy into each said path.

6. The invention of claim 5 wherein said polarizer is oriented to introduce approximately equal amounts of light energy into each of said paths.

7. The invention of claim 1 wherein said optical fiber comprises a tubing member having an optical fiber arrangement extending longitudinally along said tubing in a wall section thereof so as to amplify the effect on said fiber arrangement of the environmental factor applied to said member.

8. The invention of claim 7 wherein said tubing is elongated in one of its cross-sectional dimensions, so as to provide at least a pair of laterally elongated walls, and said fiber is carried within one of said laterally elongated walls.

9. The invention of claim 1 wherein said introducing means includes introducing light energy of at least two different wavelengths to both said paths, and said evaluating means includes means for separately evaluating and comparing the combined light energy of each of each of said combined wavelengths.

10. The invention of claim 9 wherein said optical fiber is a single mode optical waveguide fiber having a single mode with two polarization states which define said different paths.

11. A transducer comprising:
an optical fiber arrangement including a single mode optical waveguide fiber having at least two mutually orthogonal polarization states extending over a given length with the propagation constant of at least one of said states being variable in response to an environmental factor applied to at least a portion of said given length, and a structural member adapted for amplifying the effect on said propagation constant of the environmental factor applied to said structural menber, said fiber being embedded within said structural member;
means for introducing light energy of fixed phase relationship into both said polarization states.
means for combining the light energy transmitted along said fiber in said states so as to provide interference therebetween; and
evaluating means for evaluating said interference and for providing an output related thereto.

12. The invention of claim 11 wherein said fiber arrangement forms a single mode waveguide fiber, and said two paths are the polarization states of said fiber.

13. The invention of claim 11 wherein said structural member is adapted to convert an isotropic stress on said member to an anisotropic stress on said fiber.

14. The invention of claim 13 wherein said fiber is a single mode waveguide fiber and said two paths are the polarization states of said fiber.

15. The invention of claim 14 wherein said fiber is embedded within one portion of said structural member having a different thermal coefficient of expansion than other portions thereof so that said structural member produces birefringing stress on said fiber arrangement due to thermal variations applied to said member thereby providing a temperature tranducer.

16. The invention of claim 15 wherein said member is an elongated rod member having an outer sleeve forming said one portion and an inner cylinder forming said other portion.

17. The invention of claim 15 wherein said member comprises an elonqated hollow tube member having a plate portion extending across its interior, said plate forming said one member and said tube forming said other member.

18. The invention of claim 11 wherein said structural member is a tubing having a fiber portion extending longitudinally therealong in a wall section thereof.

19. The invention of claim 18 wherein said tubing is elongated in one of its cross-sectional dimensions so as to provide at least a pair of laterally elongated walls, and said fiber portion is carried within one of said laterally extended walls.

20. The invention of claim 19 wherein said one wall extends across the inner diameter of said tubing.

21. The invention of claim 19 wherein said tubing is elliptical in cross-section and said one wall extends along one axis of the ellipse.

22. The invention of claim 11 wherein said structural member is a tubing elongated in one of its cross-sectional dimensions, and said fiber is carried within the opening of and extended longitudinally along said tubing in contact with opposing walls of the narrow dimension of said cross-section.

23. The invention of claim 11 wherein said fiber and said structural member include an elongated glass cylinder having a glass fiber optics core extending longitudinally therein at the surface thereof, with an overlying layer of birefringent sensitive material, and said cylinder and said layer having an index of refraction lower than that of said core.

24. The invention of claim 23 wherein the thickness of said layer is two to three times the diameter of said core.

25. The invention of claim 25 wherein said layer has an index of refraction slightly lower than that of said cylinder.

26. The invention of claim 23 wherein said layer is plastic material.

27. The invention of claim 23 wherein said structural member is coiled about a solid mandrel with the fiber bearinq portion thereof adjoining said mandrel, and further including a flexible casing surrounding said coiled member for transmitting external pressure thereto.

28. A transducer comprising:
an optical fiber arrangement having at least two different optical paths extending over a given length of said fiber with the propagation constant of at least one of said paths being variable in response to force applied to at least a portion of said given length, said optical fiber arrangement being exbedded within a structural member adapted to convert an isotropic stress on said member to an anisotropic stress on said fiber.

29. The invention of claim 28 wherein said fiber is a single mode waveguide fiber and said two paths are the polarization states of said fiber.

30. The invention of claim 28 wherein said fiber is imbedded within one portion of said structural member having different thermal coefficient of expansion than other portions thereof so that said structural member produces birefringent stress on said fiber arrangement due to thermal variations applied to said member thereby providing a temperature responsive transducer.

31. The invention of claim 28 wherein said structural member is a tubing having a fiber portion extending longitudinally along a wall section thereof.

32. The invention of claim 28 wherein said tubing is elongated in one of its cross-sectionoal dimensions and said fiber portion is carried within an elongated wall thereof.

* * * * *